(12) United States Patent
West et al.

(10) Patent No.: US 9,555,719 B2
(45) Date of Patent: Jan. 31, 2017

(54) SYSTEM AND METHOD FOR OPTIMIZING HYBRID VEHICLE BATTERY USAGE CONSTRAINTS

(71) Applicant: Allison Transmission, Inc., Indianapolis, IN (US)

(72) Inventors: Stephen T. West, New Palestine, IN (US); Jeffrey K. Runde, Fishers, IN (US); Aaron Rues, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 14/838,410

(22) Filed: Aug. 28, 2015

(65) Prior Publication Data

US 2015/0367748 A1  Dec. 24, 2015

Related U.S. Application Data

(63) Continuation of application No. PCT/US2014/020390, filed on Mar. 4, 2014.

(60) Provisional application No. 61/782,275, filed on Mar. 14, 2013.

(51) Int. Cl.
  *H02P 1/00* (2006.01)
  *B60L 11/18* (2006.01)
  *B60W 10/26* (2006.01)

(52) U.S. Cl.
  CPC ........ *B60L 11/1872* (2013.01); *B60L 11/1803* (2013.01); *B60L 11/1857* (2013.01); *B60W 10/26* (2013.01); *B60W 20/13* (2016.01); *B60W 2710/246* (2013.01)

(58) Field of Classification Search
  USPC .............. 318/139, 400.08; 180/65.29, 65.21; 320/104, 136, 150; 429/248; 701/22
  See application file for complete search history.

(56) References Cited

U.S. PATENT DOCUMENTS

| 4,937,528 | A  | * | 6/1990  | Palanisamy ........ G01R 31/3648 320/132 |
| 6,441,588 | B1 |   | 8/2002  | Yagi et al. |
| 6,469,403 | B2 |   | 10/2002 | Omata et al. |

(Continued)

FOREIGN PATENT DOCUMENTS

| DE | 102007038586 A1 | * | 2/2009 | .......... B60L 11/1809 |
| DE | 102007038586 A1 |   | 2/2009 | |

(Continued)

OTHER PUBLICATIONS

International Search Report and Written Opinion issued in PCT/US2014/020390, dated Jun. 17, 2014, 13 pgs.

*Primary Examiner* — Jorge L Carrasquillo
(74) *Attorney, Agent, or Firm* — Woodard, Emhardt, Moriarty, McNett & Henry LLP (57) ABSTRACT

A hybrid system including a hybrid control module for operating the hybrid system to as to have its energy storage device meet a predetermined service life metric is disclosed. The hybrid control module stores experimental information indicative of the impact of certain usage parameters on the service life of the energy storage device, monitors the actual usage parameters observed during operation of the hybrid system, and dynamically determines a maximum operating temperature for the energy storage device in order to increase or decrease its utilization by the hybrid system.

22 Claims, 7 Drawing Sheets

(56) References Cited

U.S. PATENT DOCUMENTS

| | | |
|---|---|---|
| 6,518,732 B2 | 2/2003 | Palanisamy |
| 6,633,165 B2 * | 10/2003 | Bertness ............ G01R 31/3624 320/134 |
| 6,686,724 B2 | 2/2004 | Coates et al. |
| 6,727,676 B2 | 4/2004 | Ochiai |
| 6,904,342 B2 | 6/2005 | Hanada et al. |
| 7,009,401 B2 | 3/2006 | Kinoshita et al. |
| 7,015,676 B2 | 3/2006 | Kohama et al. |
| 7,021,409 B2 | 4/2006 | Tamor |
| 7,078,877 B2 | 7/2006 | Salasoo et al. |
| 7,131,708 B2 | 11/2006 | Tao et al. |
| 7,295,902 B2 | 11/2007 | Chen et al. |
| 7,305,873 B2 | 12/2007 | Hubbard et al. |
| 7,407,026 B2 | 8/2008 | Tamor |
| 7,449,891 B2 | 11/2008 | Cawthorne |
| 7,479,761 B2 | 1/2009 | Okumura |
| 7,482,767 B2 | 1/2009 | Tether |
| 7,486,036 B2 | 2/2009 | Oyobe et al. |
| 7,521,935 B2 | 4/2009 | Uchida |
| 7,538,520 B2 | 5/2009 | Zettel et al. |
| 7,550,946 B2 | 6/2009 | Zettel et al. |
| 7,598,712 B2 | 10/2009 | Zettel et al. |
| 7,638,980 B2 | 12/2009 | Zettel et al. |
| 7,639,018 B2 | 12/2009 | Zettel et al. |
| 7,645,209 B2 | 1/2010 | Dreibholz et al. |
| 7,647,205 B2 | 1/2010 | Heap et al. |
| 7,657,350 B2 | 2/2010 | Moran |
| 7,661,370 B2 | 2/2010 | Pike et al. |
| 7,677,341 B2 | 3/2010 | Tomo |
| 7,719,238 B2 | 5/2010 | Iida et al. |
| 7,730,984 B2 | 6/2010 | Heap et al. |
| 7,768,235 B2 | 8/2010 | Tae et al. |
| 7,770,676 B2 | 8/2010 | Tenbrock et al. |
| 7,770,678 B2 | 8/2010 | Nozaki et al. |
| 7,784,575 B2 | 8/2010 | Yamanaka et al. |
| 7,795,844 B2 | 9/2010 | Ichikawa et al. |
| 7,800,345 B2 | 9/2010 | Yun et al. |
| 7,828,693 B2 | 11/2010 | Soliman et al. |
| 7,836,985 B2 | 11/2010 | Itoh |
| 7,863,789 B2 | 1/2011 | Zepp et al. |
| 7,865,287 B2 | 1/2011 | Huseman |
| 7,878,282 B2 | 2/2011 | Kumazaki et al. |
| 7,893,637 B2 | 2/2011 | Shuama et al. |
| 7,908,064 B2 | 3/2011 | Cawthorne et al. |
| 7,923,950 B2 | 4/2011 | Takahashi |
| 7,928,699 B2 | 4/2011 | Kohn |
| 7,935,015 B2 | 5/2011 | Tabata et al. |
| 7,967,091 B2 | 6/2011 | Yamazaki et al. |
| 7,977,896 B2 | 7/2011 | Heap et al. |
| 7,987,934 B2 | 8/2011 | Huseman |
| 7,998,023 B2 | 8/2011 | Holmes et al. |
| 8,000,866 B2 | 8/2011 | Heap et al. |
| 8,002,667 B2 | 8/2011 | Hsieh et al. |
| 8,010,247 B2 | 8/2011 | Heap et al. |
| 8,020,652 B2 | 9/2011 | Bryan et al. |
| 8,022,674 B2 | 9/2011 | Miura |
| 8,029,408 B2 | 10/2011 | Seel |
| 8,030,883 B2 | 10/2011 | Katayama |
| 8,035,324 B2 | 10/2011 | Heap |
| 8,035,349 B2 | 10/2011 | Lubawy |
| 8,047,959 B2 | 11/2011 | Fuechtner et al. |
| 8,053,921 B2 | 11/2011 | Ichikawa |
| 8,063,609 B2 * | 11/2011 | Salasoo ............ B60L 3/0046 320/103 |
| 8,078,417 B2 | 12/2011 | Ishishita |
| 8,082,743 B2 | 12/2011 | Hermann et al. |
| 8,091,667 B2 | 1/2012 | Zettel et al. |
| 8,098,050 B2 | 1/2012 | Takahashi |
| 8,204,702 B2 | 6/2012 | Center |
| 2004/0070353 A1 * | 4/2004 | Kayukawa ............... B60K 6/48 318/139 |
| 2005/0040789 A1 | 2/2005 | Salasoo et al. |
| 2005/0077877 A1 * | 4/2005 | Cawthorne ........... B60W 10/26 320/128 |
| 2005/0246076 A1 * | 11/2005 | Chen .................... B60W 10/06 701/22 |
| 2007/0090803 A1 | 4/2007 | Yun et al. |
| 2007/0284162 A1 | 12/2007 | Zettel et al. |
| 2007/0284163 A1 * | 12/2007 | Heap ..................... B60K 6/365 180/65.29 |
| 2007/0285061 A1 * | 12/2007 | Zettel .................... B60L 3/0046 320/132 |
| 2007/0285097 A1 | 12/2007 | Zettel |
| 2008/0224478 A1 | 9/2008 | Tamor |
| 2008/0249745 A1 * | 10/2008 | Heap .................... B60L 11/1861 702/183 |
| 2009/0037060 A1 | 2/2009 | Carlhammar et al. |
| 2009/0118929 A1 | 5/2009 | Heap et al. |
| 2009/0118941 A1 | 5/2009 | Heap |
| 2009/0118964 A1 | 5/2009 | Snyder et al. |
| 2009/0118971 A1 | 5/2009 | Heap et al. |
| 2009/0204280 A1 | 8/2009 | Simon, Jr. et al. |
| 2009/0308674 A1 | 12/2009 | Bhattarai et al. |
| 2010/0000809 A1 | 1/2010 | Nishi |
| 2010/0116235 A1 | 5/2010 | Imamura et al. |
| 2010/0125019 A1 | 5/2010 | Tabata et al. |
| 2010/0185405 A1 * | 7/2010 | Aoshima ............... B60L 3/0046 702/63 |
| 2010/0250037 A1 | 9/2010 | Yoshida et al. |
| 2010/0262308 A1 | 10/2010 | Anderson et al. |
| 2010/0263952 A1 | 10/2010 | Richter et al. |
| 2010/0299036 A1 | 11/2010 | Vespasien |
| 2010/0312422 A1 | 12/2010 | Imaseki |
| 2011/0040433 A1 | 2/2011 | Steuernagel |
| 2011/0048823 A1 | 3/2011 | Connolly et al. |
| 2011/0130904 A1 | 6/2011 | McGrogan et al. |
| 2011/0288704 A1 | 11/2011 | Schwarz et al. |
| 2011/0301791 A1 | 12/2011 | Swales et al. |
| 2011/0320075 A1 | 12/2011 | Kim et al. |
| 2012/0316810 A1 | 12/2012 | Syed |
| 2014/0292283 A1 * | 10/2014 | Timmons ............ B60L 11/1809 320/152 |

FOREIGN PATENT DOCUMENTS

| | | |
|---|---|---|
| EP | 2218131 A1 | 8/2010 |
| JP | 2003199211 A * | 7/2003 |
| JP | 2003199211 A | 7/2003 |
| JP | 2011-189768 A | 9/2011 |

* cited by examiner

SYSTEM AND METHOD FOR OPTIMIZING HYBRID VEHICLE BATTERY USAGE CONSTRAINTS

CROSS REFERENCE TO RELATED APPLICATIONS

This application is a continuation of International Application No. PCT/US2014/020390 filed Mar. 4, 2014 which claims the benefit of U.S. Provisional Patent Application Ser. No. 61/782,275 filed Mar. 14, 2013 entitled "SYSTEM AND METHOD FOR OPTIMIZING HYBRID VEHICLE BATTERY USAGE CONSTRAINTS" which are hereby incorporated by reference in their entirety to the extent not inconsistent.

BACKGROUND

The present invention generally relates to an energy storage system and, more particularly, to an energy storage control module to be incorporated into a hybrid electric motor vehicle to control the storage and usage of high voltage energy.

Over the past few years, there has been a growing concern over global climate change due to an increase in carbon dioxide levels as well as oil supply shortages. As a result, automobile manufactures and consumers are beginning to have a greater interest in motor vehicles having low emissions and greater fuel efficiency. One viable option is a hybrid electric vehicle (HEV) which allows the vehicle to be driven by an electric motor, combustion engine, or a combination of the two.

Though various features are important to the overall HEV design, the system which stores the energy available for use by the vehicle is a key component. The energy storage system is provided within the HEV to store the energy created by a generator in order for that energy to be available for use by the hybrid system at some later time. For example, the stored energy may be used to drive an electric motor to independently propel the motor vehicle or assist the combustion engine, thereby reducing gasoline consumption.

However, energy storage systems face a variety of design complications, such as over-heating, weight, complexity, ease of incorporation into the vehicle, ease of service, service life and cost, just to name a few. Additionally, known energy storage systems utilize a specific and known number of battery packs and are designed to meet a particular HEV design specification, including a defined service life.

Numerous hybrid systems have been proposed which are statically designed to protect the service life of the battery packs. Typically, those hybrid systems include battery usage constraints which are programmed into the hybrid control module at the time of production to keep the battery in a good usage state for a certain service life, such as a warranty or contract obligation. If the operating temperature of the battery is too high, or short term amperage is too much, the hybrid control module will restrict or limit usage of the battery. However, these systems sacrifice potential fuel-economy for the vehicle each time they prevent the battery from being utilized. This often happens much more than necessary, as the manufacturer often conservatively assumes the worst with respect to the operation of the HEV in order to ensure that all vehicles meet their defined service life goal. Over the course of time, these restrictions upon the usage of the battery can amount to a significant reduction in the efficiency of the HEV. While this often leads to a battery life that significantly exceeds its defined service life, it would preferred to have that extended life exchanged for more usage and ultimately, increased fuel efficiency, given that the battery can often be replaced for a lesser cost.

In order to determine the battery usage limits, typically a number of laboratory tests are run based upon a predicted usage of the battery in customer applications. These predictions are often not very accurate as they are often quite conservative in order to prevent failure under the more extreme operational circumstances. However, this leads to a significant sacrifice with respect to an optimal balance between battery-life and fuel efficiency of the vehicle.

Thus, there is a need for improvement in this field.

SUMMARY

A method for operating a hybrid electric vehicle having an electric machine and at least one energy storage module using a hybrid control module to regulate the maximum operating temperature for the energy storage module so as to achieve a predefined service life target is disclosed.

The method provides for the establishment of a predetermined service life target in a selected metric and an initial maximum operating temperature for the energy storage module. Subsequent operation of the hybrid electric vehicle is controlled by the hybrid control module such that the actual operating temperature of the energy storage module does not exceed the maximum operating temperature. Concurrently, the hybrid control module calculates a first indicator of the progress of the past operation of the energy storage module toward the predetermined service life target, wherein that indicator is adjusted based upon a plurality of actual observed usage parameters.

Subsequently, based on the calculated indicators, the hybrid control module is capable of modifying the maximum operating temperature for the energy storage module to enlarge or limit the circumstance under which the energy storage module may be utilized by the hybrid electric vehicle. The hybrid control module then operates the electric machine of the hybrid electric vehicle such that the actual operating temperature of the energy storage module does not exceed the modified maximum operating temperature.

Further forms, objects, features, aspects, benefits, advantages, and embodiments of the present invention will become apparent from a detailed description and drawings provided herewith.

DETAILED DESCRIPTION

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 1:
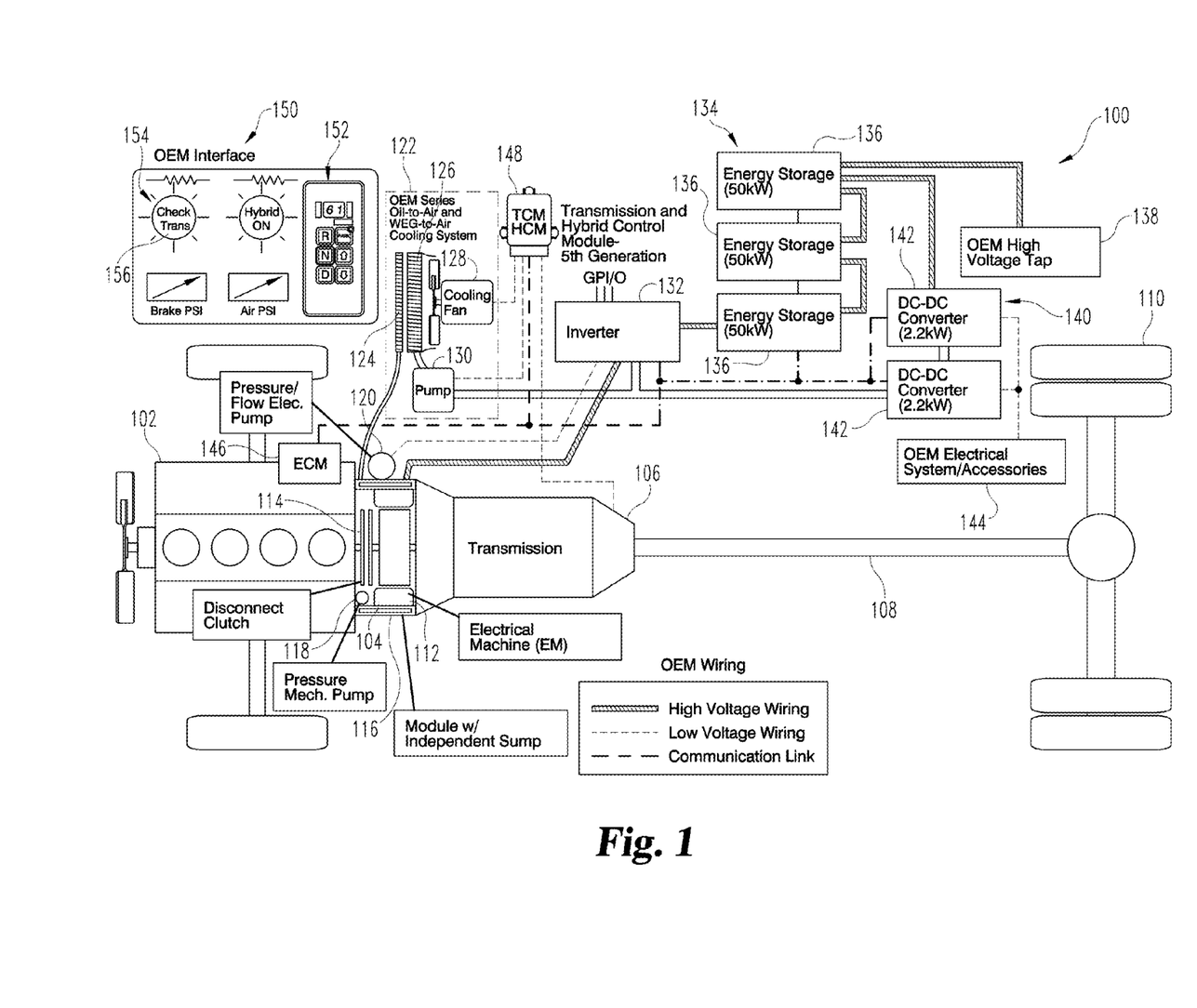
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 from the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant will be used interchangeably herein, these terms are used in a broader sense to include various types of lubricants, such as natural or synthetic oils, as well as lubricants having different properties. To circulate the fluid, the hybrid module 104 includes a mechanical pump 118 and an electrical (or electric) pump 120. With this combination of both the mechanical pump 118 and electrical pump 120, the overall size and, moreover, the overall expense for the pumps is reduced. The electrical pump 120 can supplement mechanical pump 118 to provide extra pumping capacity when required. In addition, it is contemplated that the flow through the electrical pump 120 can be used to detect low fluid conditions for the hybrid module 104. In one example, the electrical pump 120 is manufactured by Magna International Inc. of Aurora, Ontario, Canada (part number 29550817), but it is contemplated that other types of pumps can be used.

The hybrid system 100 further includes a cooling system 122 that is used to cool the fluid supplied to the hybrid module 104 as well as the water-ethylene-glycol (WEG) to various other components of the hybrid system 100 which will be described later in further detail. In one variation, the WEG can also be circulated through an outer jacket of the eMachine 112 in order to cool the eMachine 112. It should be noted that the hybrid system 100 will be described with respect to a WEG coolant, but other types of antifreezes and cooling fluids, such as water, alcohol solutions, etc., can be used. Looking at FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are connected together, preferably in parallel, to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 may be one of many different type systems for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1. In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections. In addition, the hybrid control module 148 may operate the hybrid system 100 so as to remain within one or more statically defined constraints, such as a maximum operating temperature for the energy storage system 134 and/or energy storage modules 136.

In addition, the hybrid system 100 is also designed to utilize both power takeoff (PTO) and electronic PTO (ePTO) modes in order to operate ancillary equipment such as cranes, refrigeration systems, hydraulic lifts, and the like. In a normal PTO mode, the clutch and the PTO system are engaged, and the internal combustion engine is then used to power the ancillary equipment. In an ePTO state, the clutch is disengaged and the eMachine acts as a motor to power the ancillary equipment via the PTO. While in the PTO or ePTO operational modes, the transmission can be in neutral or in gear, depending on the requirements.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit requires, then, vehicle and product line modifications and expensive testing to ensure the proper operation and safety of the vehicle, and this expenses tends to lessen or slow adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
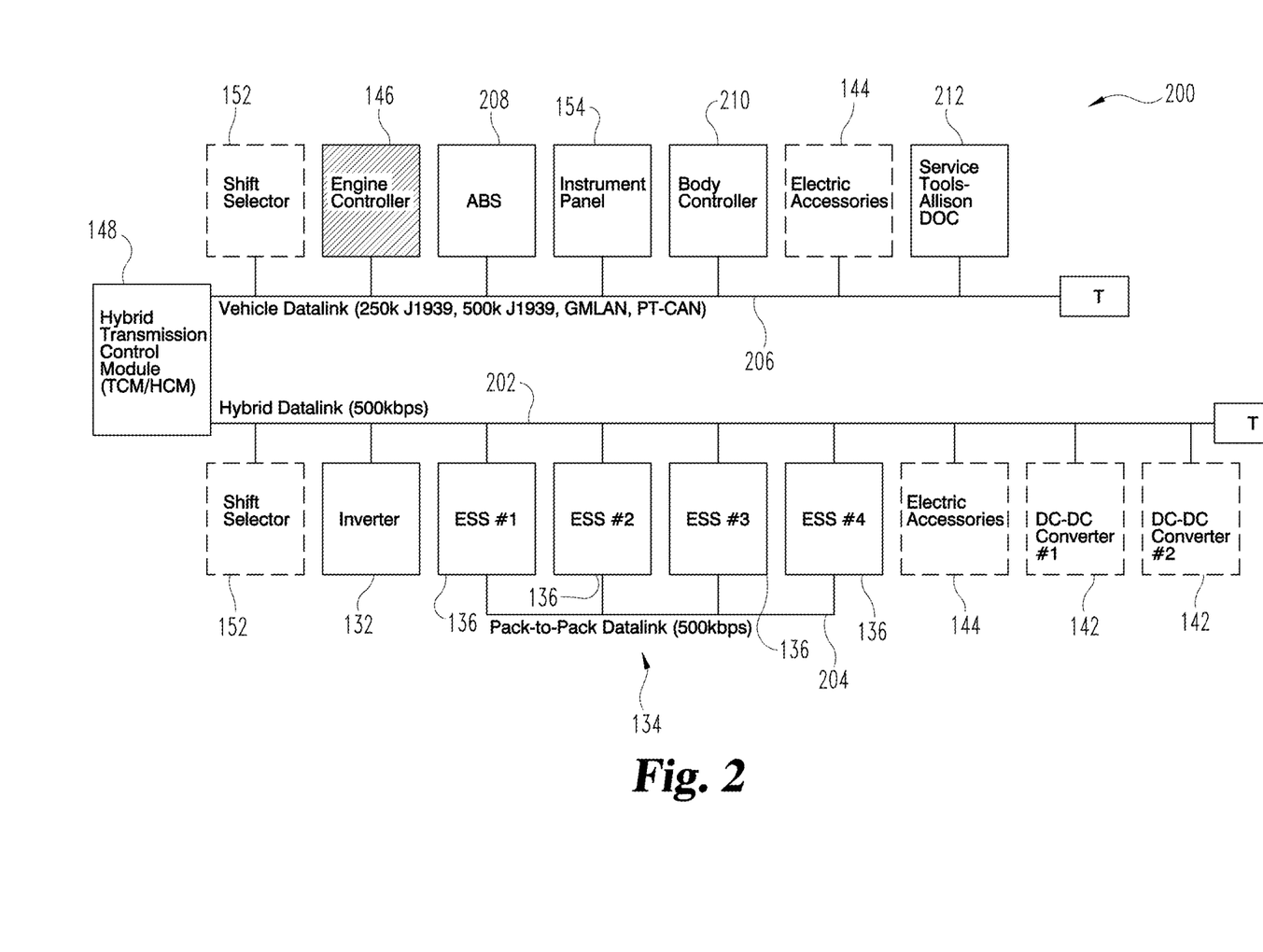
FIG. 2 illustrates a general diagram of an electrical communication system in the FIG. 1 hybrid system.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the shift selector 152, inverter 132, the energy storage system 134, the low voltage systems/accessories 144, and the DC-DC converter modules 142. Within the energy storage system 134, an energy storage module data link 204 facilitates communication between the various energy storage modules 136. However, it is contemplated that in other embodiments the various energy storage system modules 136 can communicate with one another over the hybrid data link 202. With the hybrid data link 202 and the energy storage module data link 204 being separate from the data links used in the rest of the vehicle, the control/electrical component of the hybrid system 100 can be readily tied into the vehicle with minimum impact. In the illustrated example, the hybrid data link 202 and the energy storage module data link 204 each have a 500 kilobit/second (kbps) transmission rate, but it is envisioned that data can be transferred at other rates in other examples. Other components of the vehicle communicate with the transmission/hybrid control module 148 via a vehicle data link 206. In particular, the shift selector 152, the engine control module 146, the instrument panel 154, an antilock braking system 208, a body controller 210, the low voltage systems/accessories 144, and service tools 212 are connected to the vehicle data link 206. For instance, the vehicle data link 206 can be a 250 k J1939-type data link, a 500 k J1939-type data link, a General Motors LAN, or a PT-CAN type data link, just to name a few examples. All of these types of data links can take any number of forms such as metallic wiring, optical fibers, radio frequency, and/or a combination thereof, just to name a few examples.

In terms of general functionality, the transmission/hybrid control module 148 receives power limits, capacity available current, voltage, temperature, state of charge, status, and fan speed information from the energy storage system 134 and the various energy storage modules 136 within. The transmission/hybrid control module 148 in turn sends commands for connecting the various energy storage modules 136 so as to supply voltage to and from the inverter 132. The transmission/hybrid control module 148 also receives information about the operation of the electrical pump 120 as well as issues commands to the auxiliary electrical pump 120. From the inverter 132, the transmission/hybrid control module 148 receives a number of inputs such as the motor/generator torque that is available, the torque limits, the inverter's voltage current and actual torque speed. Based on that information, the transmission/hybrid control module 148 controls the torque speed and the pump 130 of the cooling system. From the inverter 132, it also receives a high voltage bus power and consumption information. The transmission/hybrid control module 148 also monitors the input voltage and current as well as the output voltage and current along with the operating status of the individual DC-DC converter modules 142 of the DC-DC converter system 140. The transmission/hybrid control module 148 also communicates with and receives information from the engine control module 146 and in response controls the torque and speed of the engine 102 via the engine control module 146.

Turning to FIGS. 3-6, calibration graphs illustrating the observed impact (usage factor) of a selected usage parameter on the life of an energy storage module are provided. It shall be appreciated that the values and usage factors reflected by the graphs are specific to each energy storage module, based upon its design and specifications. However, information of the type represented by FIGS. 3-6 is preferably stored within hybrid control module 148, and may be subsequently updated, such as in the case of updated test results or a change in the type of energy storage module utilized within hybrid system 100, such as an optional upgrade at purchase or a replacement upon the end of its service life. Furthermore, it shall be appreciated that additional calibration graphs for other selected usage parameters may be included and utilized (whether in addition to or in place of those described herein) in other forms of the present invention.

Figure 3:
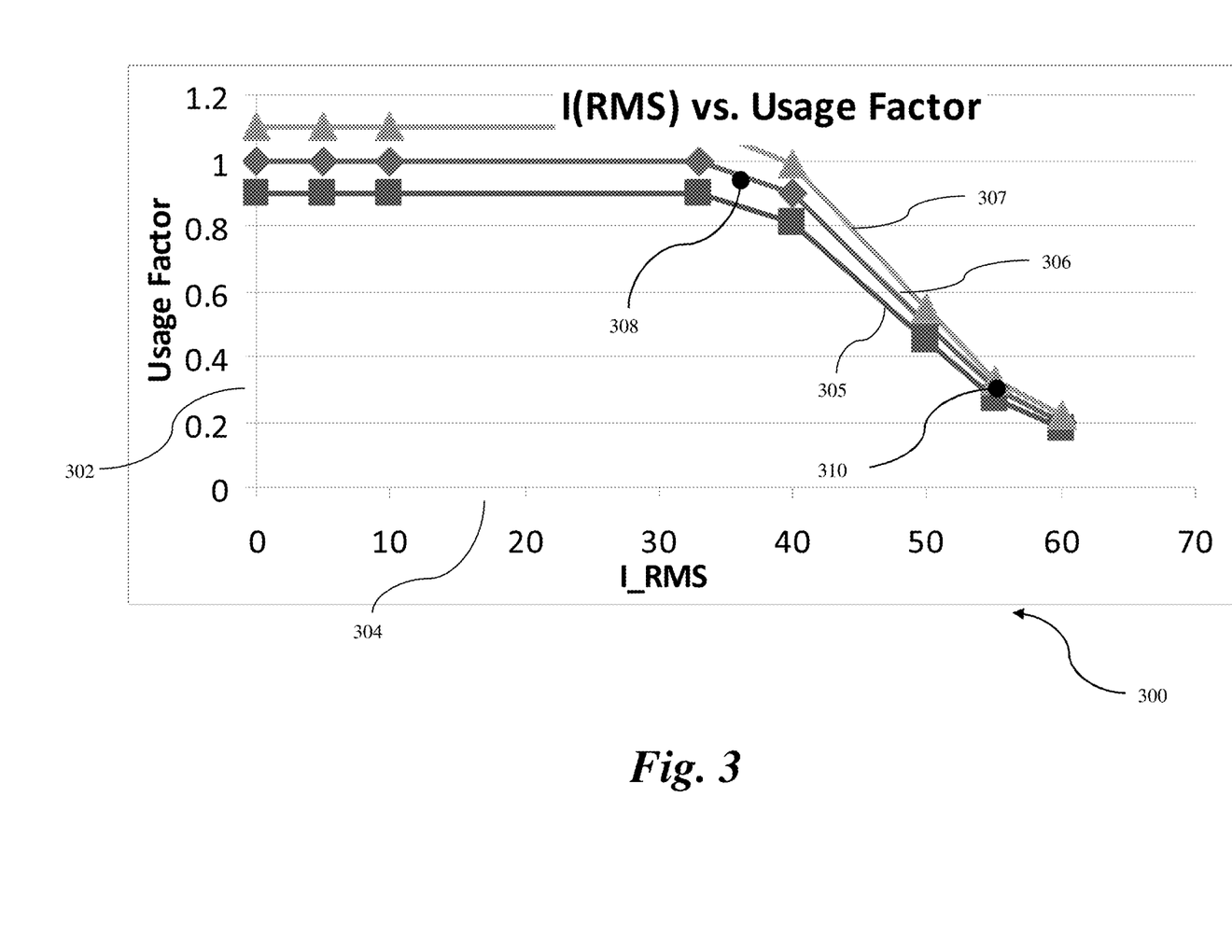
FIG. 3 illustrates a representative graph of the impact of a selected range of $I_{RMS}$ (short term average current) values on the actual life of an energy storage module.

Beginning with FIG. 3, a representative graph 300 showing one example of the impact of a selected range of $I_{RMS}$ (short term average current) values on the actual life of an energy storage module, such as the type utilized by hybrid system 100, is illustrated. In graph 300 a calculated usage factor is plotted along the vertical axis 302, while $I_{RMS}$ is plotted along the horizontal axis 304. Line 306 represents the average results of testing of the selected energy storage module under simulated operation throughout the range, while lines 305 and 307 reflect the lower and upper bands of a corresponding confidence interval. As can be seen, in this particular example, operating the energy storage module at a higher $I_{RMS}$ lowers its service life. Furthermore, operating the energy storage module at an $I_{RMS}$ above approximately 35 amperes, as indicted by the portion of line 306 which is right of point 308, begins to lower its service life much more rapidly with each additional increase in $I_{RMS}$. Once the $I_{RMS}$ reaches approximately 55 amperes, shown by point 310, the marginal impact upon the service life of the energy storage module begins to slow down; however, operation in this range still significantly shortens the service life of the device. Assuming that the selected energy storage module is rated for 100,000 Ampere-Hours at an ideal $I_{RMS}$ of 25 amperes, the impact in equivalent Ampere-Hours of operation for one hour at any other $I_{RMS}$ may be determined using the information contained in graph 300, or one of its kind. For example, it may be that 1 Ampere-Hour at the ideal $I_{RMS}$ of 25 amperes is equivalent to 2 Ampere-Hours at an $I_{RMS}$ of 50 amperes.

Figure 4:
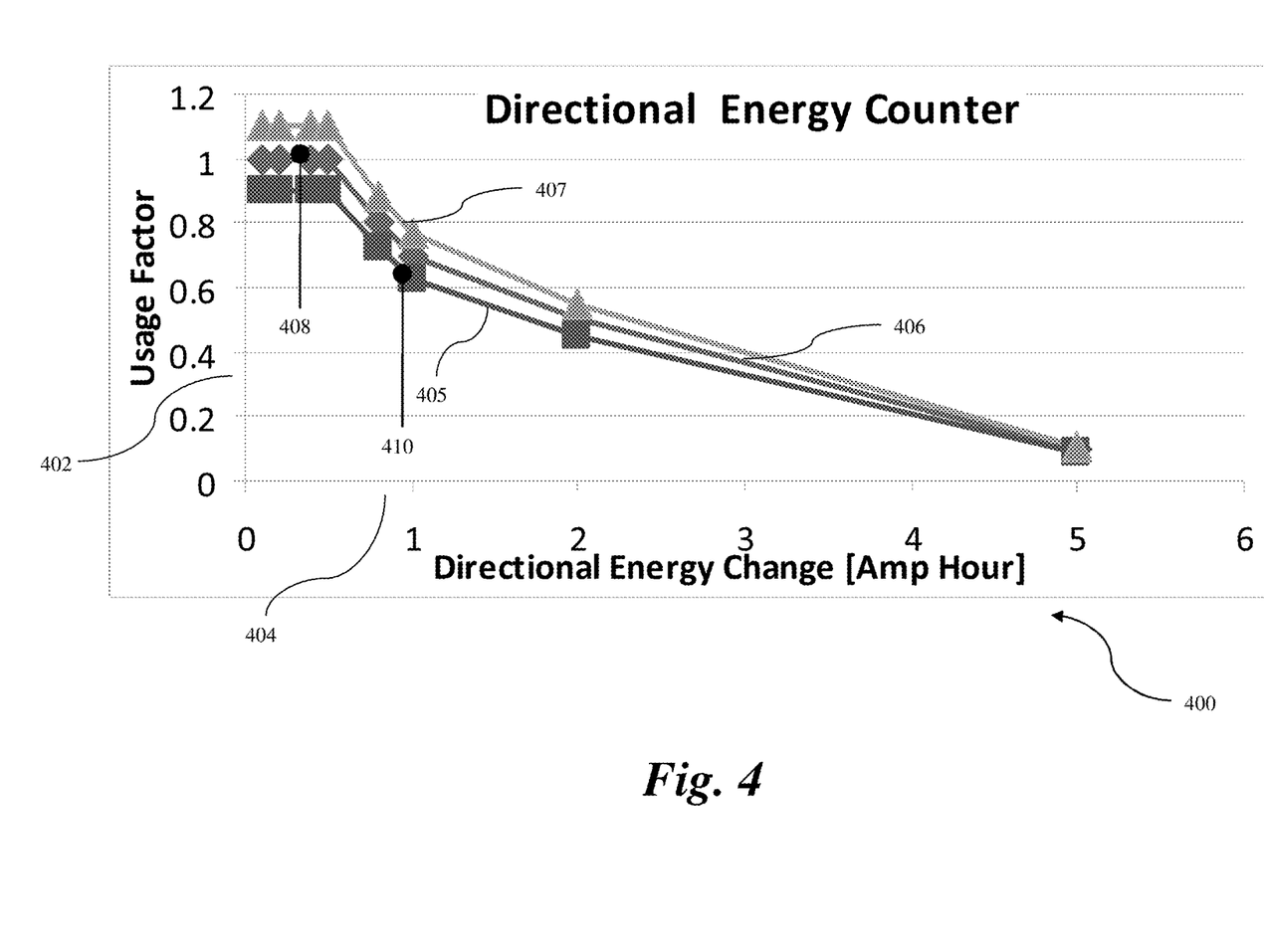
FIG. 4 illustrates a representative graph of the impact of a selected range of direction energy values on the actual life of an energy storage module.

Turning to FIG. 4, a representative graph 400 showing one example of the impact of a selected range of direction energy values on the actual life of an energy storage module, such as the type utilized by hybrid system 100, is illustrated. The directional energy is the absolute value of the amount of energy placed in by charging or utilized during electrical drive without a state change. For example, large directional energy occurs when the energy storage module is either charged or discharged over a significant state of charge range, such as ePTO usage as opposed to traditional hybrid usage, without the occurrence of the opposite event, despite the potential for intervening periods of inactivity. In graph 400 a calculated usage factor is plotted along the vertical axis 402, while the direction energy is plotted along the horizontal axis 404. Line 406 represents the average results of testing of the selected energy storage module under simulated operation throughout the range, while lines 405 and 407 reflect the lower and upper bands of a corresponding confidence internal. As can be seen, in this particular example, operating the energy storage module such that larger amounts of energy are moved into and out of the device in large chunks lowers its service life at a somewhat logarithmically increasing rate. Furthermore, operating the energy storage module such that its is charged with more than approximately ½ ampere-hour without any periods of discharge or discharged with more than about ½ ampere-hour without any period of charging, as indicted by the portion of line 406 which is right of point 408, begins to lower its service life at an increasing rate. Once the directional energy reaches 1 ampere-hour in a given direction, shown by point 410, the marginal impact upon the service life of the energy storage module begins to slow down; however, operation in this range still significantly shortens the service life of the device. Again, assuming that the selected energy storage module is rated for 100,000 Ampere-Hours at a directional energy maximum of ½ ampere-hour, the impact in equivalent Ampere-Hours of operation for one hour with a directional energy of a higher rate may be determined using the information contained in graph 400, or one of its kind. For example, it may be that 1 Ampere-Hour with an ideal maximum directional energy of ¼ ampere-hour is equivalent to 10 Ampere-Hours at a directional energy of 5 ampere-hours.

Figure 5:
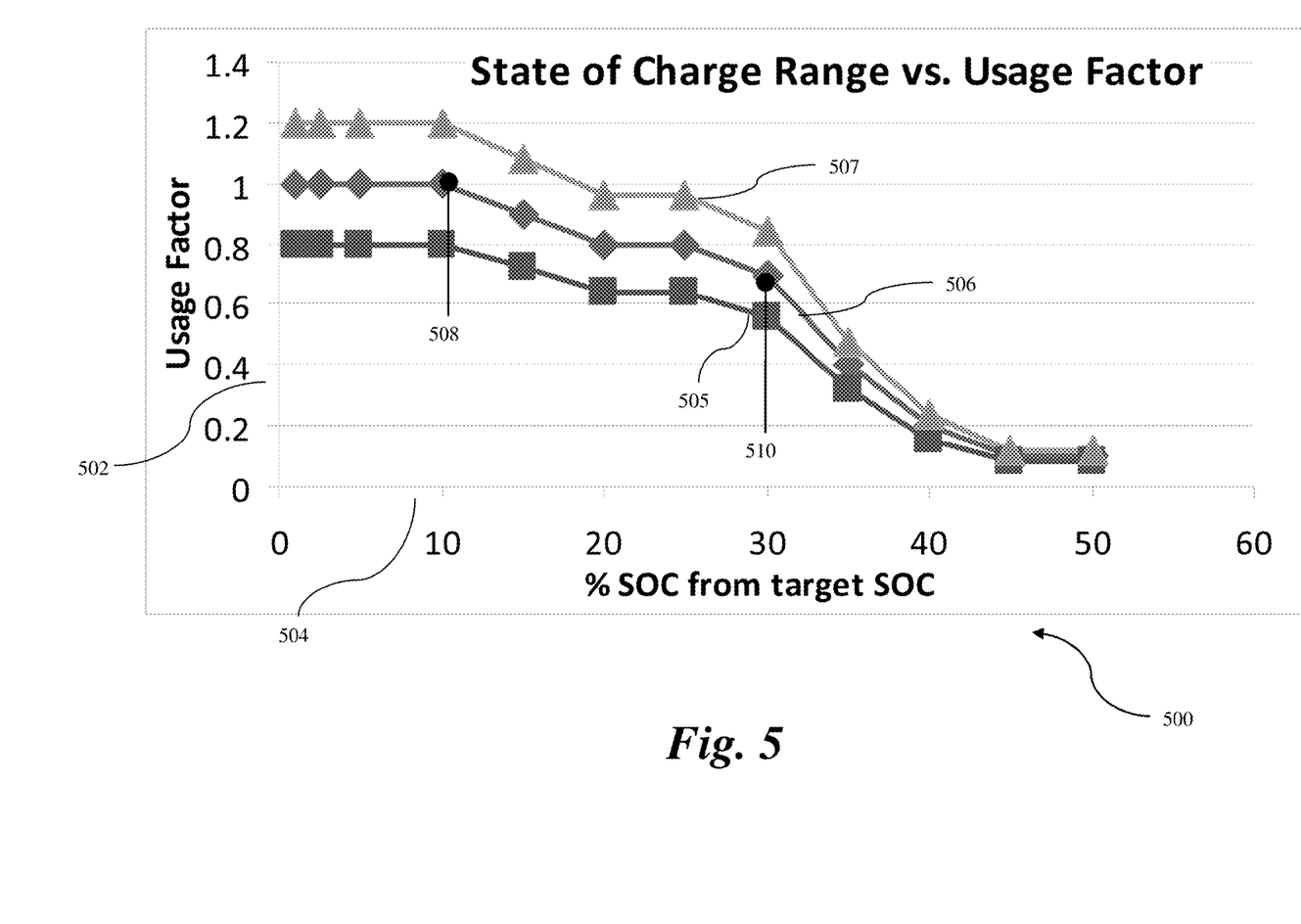
FIG. 5 illustrates a representative graph 500 of the impact of the offset from ideal state of charge ($\Delta SOC$) on the actual life of an energy storage module.

Turning to FIG. 5, a representative graph 500 showing one example of the impact of the offset from the ideal state of charge ($\Delta$SOC) on the actual life of an energy storage module, such as the type utilized by hybrid system 100, is illustrated. The state of charge (SOC) is the equivalent of a fuel gauge for a battery, however, it must be determined indirectly using method such as based upon its chemical composition, voltage, coulomb counting, Kalman Filtering or pressure, depending upon the type of battery utilized. However, most hybrid vehicles already include a mechanism for determining the SOC for display to the operator. Here, the parameter under consideration is the offset in SOC percentage from the ideal state of charge, which is the offset from the ideal state of charge (i.e. the state of charge at which the battery is capable of operating for the longest life). In graph 500 a calculated usage factor is plotted along the vertical axis 502, while the $\Delta$SOC is plotted along the horizontal axis 504. Thus, for example, if the ideal SOC is 50%, 50% $\Delta$SOC would represent operation at 100% or 0% SOC as the maximum offset in that case is 50% on either side of the ideal. Line 506 represents the average results of testing of the selected energy storage module under simulated operation throughout the range, while lines 505 and 507 reflect the lower and upper bands of a corresponding confidence interval. As can be seen, in this particular example, operating the energy storage module in its lower $\Delta$SOC (i.e. $\Delta$SOC<10%, which is closest to the ideal SOC), as indicted by the portion of line 506 which is left of point 508, provides for the longest service life. Operation at a $\Delta$SOC between 10% and 30% causes for a slight negative impact upon its service life, as indicted by the portion of line 506 which is between points 508 and 510. However, operation at a $\Delta$SOC above 30%, as indicted by the portion of line 506 which is right of point 510, causes for an increased negative impact upon its service life. As above, assuming that the selected energy storage module is rated for 100,000 Ampere-Hours at a maximum $\Delta$SOC of 10% or less, the impact in equivalent Ampere-Hours of operation for one hour with a $\Delta$SOC of a higher percentage may be determined using the information contained in graph 500, or one of its kind. For example, it may be that 1 Ampere-Hour with an ideal maximum ΔSOC below 10% is equivalent to 3 Ampere-Hours at a ΔSOC of 35%.

Figure 6:
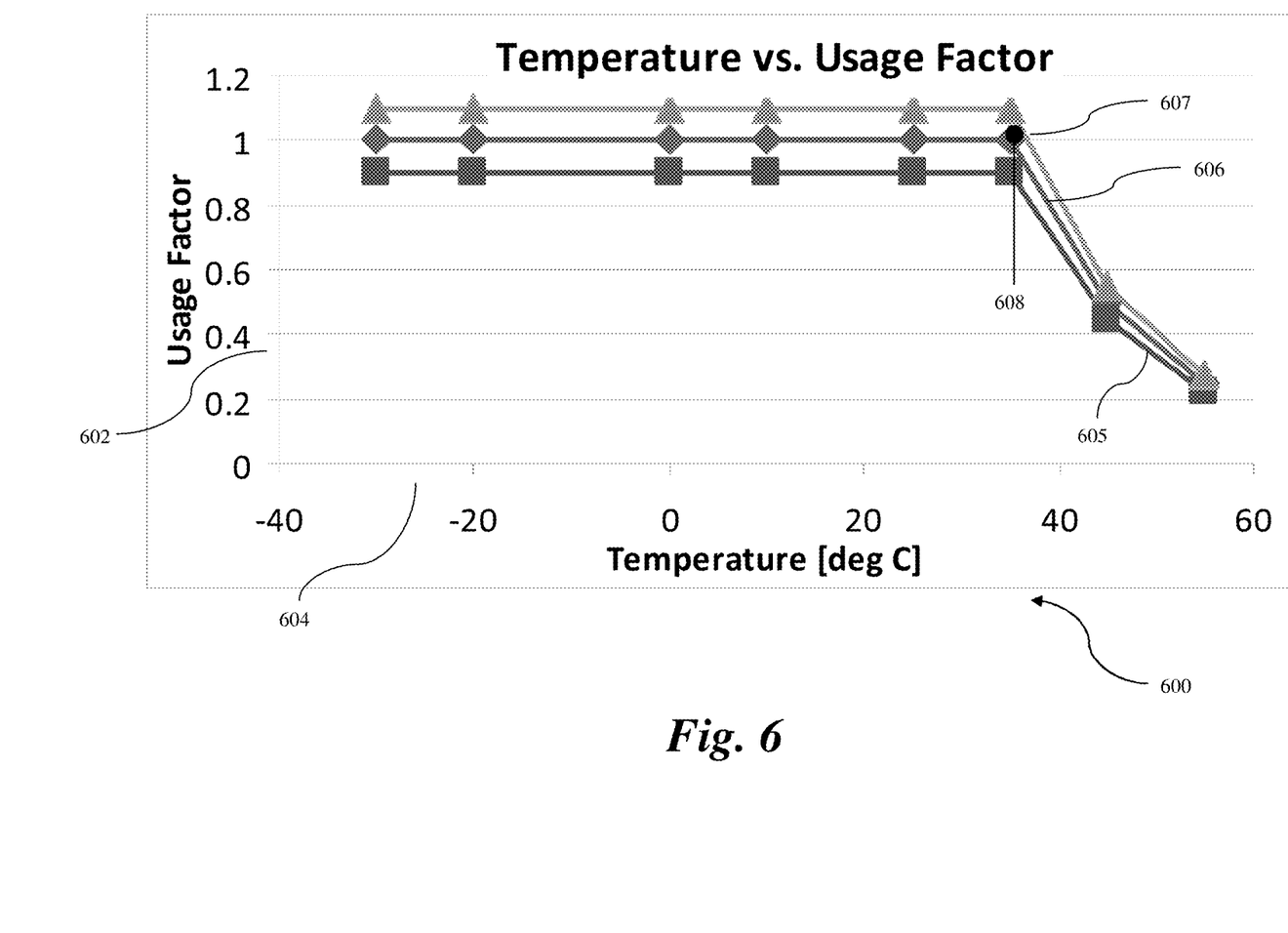
FIG. 6 illustrates a representative graph of the impact of the operating temperature on the actual life of an energy storage module.

Turning to FIG. 6, a representative graph 600 showing one example of the impact of the operating temperature on the actual life of an energy storage module, such as the type utilized by hybrid system 100, is illustrated. In graph 600 a calculated usage factor is plotted along the vertical axis 602, while the operating temperature (in ° C.) is plotted along the horizontal axis 604. Line 606 represents the average results of testing of the selected energy storage module under simulated operation throughout the range, while lines 605 and 607 reflect the lower and upper bands of a corresponding confidence interval. As can be seen, in this particular example, operating the energy storage module in its ideal operating temperature range (i.e. <35° C.), as indicted by the portion of line 606 which is left of point 608, provides for the longest service life, while operating it at temperatures above 35° C. causes a increasing negative impact upon its service life. Once again, assuming that the selected energy storage module is rated for 100,000 Ampere-Hours at an ideal temperature of 35° C. or below, the impact in equivalent Ampere-Hours of operation for one hour at a higher temperature may be determined using the information contained in graph 600, or one of its kind. For example, it may be that 1 Ampere-Hour at the ideal temperature of 35° C. or below is equivalent to 3 Ampere-Hours at a temperature of 50° C.

The above numbers and graphs are provided for demonstrative purposes only. It shall be appreciated by those of skill in the art that testing of a selected energy storage module would be required in order to ascertain the appropriate weighting to be utilized in the modules and/or processes described herein.

Figure 7:
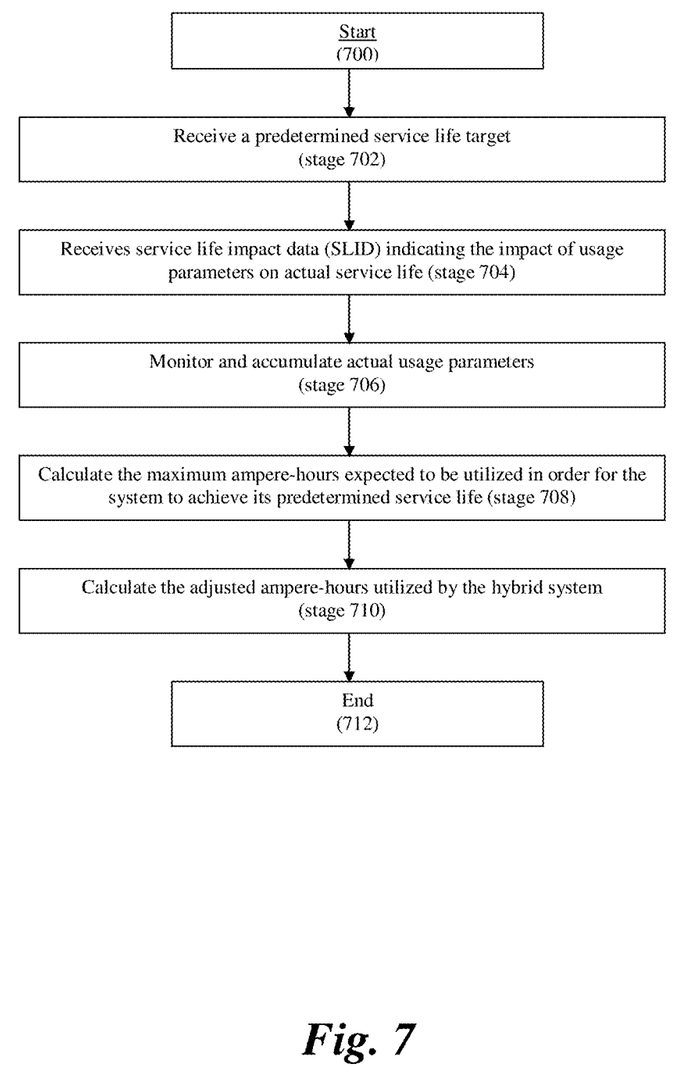
FIG. 7 illustrates a flowchart showing the steps performed by or in conjunction with a hybrid control module according to one embodiment of the disclosed hybrid system.

Certain embodiments of the hybrid control module 148 will now be discussed with continued references to FIGS. 1-6. FIG. 7 is a flowchart illustrating one example of a set of steps performed by or in conjunction with hybrid control module 148 for operating the hybrid system 100, in normal and/or ePTO modes, and more particularly, for controlling operation of the eMachine 112 and its utilization of energy storage system 134 and/or the individual energy storage modules 136. This process shall be illustrated with respect to a single energy storage module, however, it shall be appreciated that any number of energy storage modules, which are within hybrid system 100, may be controlled in parallel and that FIG. 7 is simply illustrative of the control of a single energy storage module, such as module 136. Alternatively, the process of FIG. 7 may operate to control a storage system, such as system 136 so as to monitor and control the maximum operating temperature for the energy storage modules contained therein either individually or collectively as a single unit.

The process begins at start point 700 with hybrid control module 148 receiving a predetermined service life target for energy storage module 136 (stage 702). In one form, the service life target is provided in the units of a selected metric. Common metrics which may be utilized include, but are not limited to, elapsed service time, vehicle distance traveled, total ampere-hours, and the like or any equivalents or derivatives thereof. By way of non-limiting example, representative service life targets may be 100,000 ampere-hours, six years, or 100,000 miles.

The process proceeds to stage 704 where the hybrid control module 148 receives service life impact data (SLID) indicating the impact of the values in a range of one or more usage parameters on the actual service life of energy storage module 136. In the illustrated embodiment, the SLID received in stage 704 is the underlying data reflected in FIGS. 3-6 above, and is stored in tabular form. In alternate forms, the SLID includes data indicating the impact upon the actual service life of other selected usage parameters (whether in addition to or in place of those described herein) which will be appreciated by those of skill in the art.

In certain embodiments, the predetermined service life target and/or SLID are coded into or otherwise made accessible to the hybrid control module 148 during its manufacture or the subsequent manufacture of the hybrid system 100. However, in other embodiments, the predetermined service life target and/or SLID are provided to the hybrid control module prior to the sale or delivery of the hybrid system 100 (or the vehicle which it is incorporated into) so as to match the accompanying energy storage module 136 within hybrid system 100, such as in the event multiple energy storage options exists. The predetermined service life target and/or SLID may also be subsequently updated within hybrid control module 148, so as to provide for subsequent replacement of the energy storage module 136 with those having different specification and/or the updating of the SLID with more accurate data, such as that determined from further laboratory testing.

The hybrid control module 148 is capable of monitoring, such as through series of sensors, monitors or the like, the actual observed values corresponding to the usage parameters of $I_{RMS}$ (short term average current), directional energy, offset from the ideal state of charge (ΔSOC), and actual operating temperature. In the event other operating parameters are utilized in alternate embodiments, such actual usage parameters would similarly be monitored. Once the hybrid system 100 has entered its service life, the actual usage parameters monitored are accumulated, such as by integration as a function of time, by hybrid control module 148 in stage 706. In the described embodiment, algorithms for usage parameter accumulation and subsequent adjustment are typically executed in preset loop cycles such that each usage parameter's impact upon actual service life is executed at least once every loop cycle. For purposes of non-limiting example the loop cycles may occur at regular intervals, such as every 100 milliseconds, every 1 second, or every 5 seconds during the operation of hybrid system 100, depending upon the likely change period of change for the selected usage parameters and granularity desired. Alternatively, one or more of the algorithms may be executed in response to the occurrence of an event, such as the change of state of an energy storage module 136 from charging to discharging. In certain forms, these algorithms are stored in non-volatile memory devices and are executed by one or more central processing units within hybrid control module 148 so as to effect operation control on the respective device of hybrid system 100.

As a control for the adjusted ampere-hours utilized by hybrid system 100, the hybrid control module 148 maintains, as a function of time, distance, or some other metric, the maximum ampere-hours expected to be utilized to this point of the hybrid system 100's operation in order for the energy storage system 134 or energy storage modules 136 to achieve its predetermined service life (stage 708). For example, if the service life is 5 years and an energy storage system is rated for 100,000 ampere-hours, then after one year in service, the hybrid system 100 should have utilized no more than 20,000 ampere-hours. Alternatively, if the service life is 100,000 miles and an energy storage system is rated for 100,000 ampere-hours, then after 60,000 miles, the hybrid system 100 should have utilized no more than 60,000 ampere-hours. However, as described above, due to the variation in the actual operating parameters, not every ampere-hour is the same from the perspective of the rated service life of an energy storage module.

In an effort to more closely model the progression of the energy storage module 136 toward the end of its actual service life, the hybrid control module 148 dynamically calculates an adjusted ampere-hours utilized based upon the monitoring of certain actual usage parameters of system 100 (stage 710). As described above, each actual ampere-hour may be adjusted, either up or down, depending upon the combination of one or more of the usage parameters under which it was expended. In the illustrated form, the actual ampere-hours expended in each monitored period are dynamically adjusted based upon each of the usage parameters, including $I_{RMS}$ (short term average current), directional energy, offset from the ideal state of charge ($\Delta SOC$), and actual operating temperature. In certain operating conditions, certain usage parameters may offset one another, while in others, certain usage parameters may compound upon one another to create an adjusted ampere-hour ratio which is significantly higher or lower than the actual ampere-hours expended by hybrid system 100.

In the described embodiment, a numerical usage factor is generated during stage 710 for each actual usage parameter for each period of observation, which is in the described embodiment is the selected period of the algorithmic loop. A usage factor greater than 1 indicates an actual usage parameter which results in a slower than anticipated progress toward the end of service life. Conversely, a usage factor less than 1 indicates an actual usage parameter which results in a faster rate of progress toward the end of service life. The inverse of the numerical usage factors generated are then each sequentially and functionally applied to the actual ampere-hours expended during the period. Given that each numerical usage factor is centered at 1 for the specified usage conditions, the impact of each usage parameter is accounted for when the multiplicative inverse of each of the set of usage factors are collectively multiplied by the actual ampere-hours expended. The result is an adjusted ampere-hours value for the period, which may then be integrated over time to better reflect the hybrid system 100's progress toward the end of service life of the energy storage module 136. In one form, the usage factors are determined from the data which is indicated by the line (i.e. 306, 406, 506, and 508) and measured by the vertical axis (i.e. 302, 402, 502, 602) of the corresponding observed impact graph, such as thown shown in FIGS. 3-6.

Using the differential between the maximum ampere-hours expected to be utilized based on the current progress of the hybrid system 100 toward the predetermined service life metric from stage 708 and the total adjusted ampere-hours to date from stage 710 the hybrid control module 148 may determine whether the energy storage module 136 of hybrid system 100 is being over or under utilized. Based upon such a determination, the hybrid control module adjusts the maximum operating temperature, either up or down, of the energy storage module 136 in order to either increase or decrease its usage. In operation, an increased maximum operating temperature by the hybrid control module 148 will enable the energy storage module 136 to be used for greater periods of time, or in circumstances where its usage would have otherwise been restricted. Such a dynamic increase in the maximum operating temperature will enable greater vehicle operational efficiencies to be realized while maintaining the hybrid system 100 and energy storage module 136 on path to meet the predetermined service life goal. Conversely, a decreased dynamic maximum operating temperature, which is triggered by hybrid control module 148 when the usage of the energy storage module 136 exceeds expectation, will prevent the energy storage module 136 from being used for extended periods of time, or in circumstances where its usage would ordinarily be allowed. This will provide for decreased vehicle operational efficiency, however, is necessary in order to maintaining the system 100 and energy storage module 136 on path to meet the predetermined service life goal.

After completion of stage 710 of the process, the hybrid system 100 proceeds under the operation of hybrid control module 148, with the potential of a modified maximum operating temperature for the energy storage module 136. The process loops back to stage 706 and iterates repetitively throughout the life of the hybrid system 100. The process ends at end point 712, such as the end of the service life, in which the process may be reset upon the installation of a new energy storage module. It shall be appreciated that adjustment limits may be placed upon the modification of the maximum operating temperature so as to prevent rapid adjustment early in the life of the system 100, as well as to prevent overly drastic adjustments from occurring based upon short-term usage. For example, it may be provided that a fixed minimum and maximum operating temperature are provided between which the dynamic maximum operating temperature employed by hybrid control module 148 must remain. Further, fixed minimum and maximum operating temperatures may be provided which move to increase their spread based upon the length of time the system 100 has been in service. For example, a tighter range would be provided for early in the life of the system 100, while that range increases to provide for more adjustment in each subsequent year, mileage increment, or the like. The hybrid control module may also have limits placed such that the dynamic maximum operating temperature may only be increased or decreased by a set amount with respect to its prior value within a set period of time, such as, for purposes of non-limiting example, no more than 3° C. in a one-month span, or no more than 10° C. in a one-year span.

In the described embodiment the maximum operating temperature is the operating parameter which is selected for adjustment in order to control usage of the energy storage system or module, however, it shall be appreciated that any other combination of one or more operating parameters and their corresponding operational constraints may be selected for adjustment by the hybrid control module according the process described herein so as to restrict or widen the usage of the energy storage system or module on its progression toward a predetermined service life goal.

Given that the manufacturer errs on the side of a conservative energy storage control, in order to prevent failure under the more extreme operational circumstance, usage of the presently described hybrid control module leads to significant increases in the fuel efficiency of the vehicle under more common operating conditions as the maximum operating temperature is increased, while the goal of having the energy storage system meet its predetermined service life is still met. Furthermore, the dynamic nature of the system could enable a manufacturer to be less conservative in the design and specification for the energy storage system, as when extreme usage conditions beyond what was planned for are encountered, the hybrid control module will be able to recognize that and slow down the usage of the energy storage system to ensure that the define service life is met.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method for operating a hybrid electric vehicle having an electric machine and at least one energy storage module using a hybrid control module, comprising:
   establishing a predetermined service life target for a selected metric of the energy storage module;
   establishing a maximum operating value associated with a usage parameter for the energy storage module;
   operating the electric machine such that an actual operating value of the energy storage module for the usage parameter does not exceed the defined maximum operating value;
   establishing a minimum operating value associated with the usage parameter;
   operating the electric machine such that the actual operating value of the energy storage module for the usage parameter exceeds the defined minimum operating value;
   calculating an indicator indicating progress toward the predetermined service life target, wherein the indicator is calculated using a plurality of actual usage parameter values observed during past operation of the energy storage module;
   modifying the maximum operating value for the energy storage module based upon the indicator;
   modifying the minimum operating value for the energy storage module based upon the indicator; and
   operating the electric machine such that the actual operating value of the energy storage module for the usage parameter does not exceed the modified maximum operating value.

2. The method of claim 1, wherein the selected metric is total service time of the energy storage module.

3. The method of claim 1, wherein the selected metric is accumulated vehicle distance traveled.

4. The method of claim 1, wherein the selected metric is total current over time.

5. The method of claim 1, wherein the selected metric is total ampere-hours expended.

6. The method of claim 1, wherein the plurality of actual usage parameter values includes the temperature of the energy storage module.

7. The method of claim 1, wherein the plurality of actual usage parameter values includes the offset from the ideal state of charge of the energy storage module.

8. The method of claim 1, wherein the plurality of actual usage parameter values includes the short term average current level of the energy storage module.

9. The method of claim 1, wherein the plurality of actual usage parameter values includes the direction energy flow experienced by the energy storage module.

10. A hybrid control module for performing the steps of claim 1.

11. The method of claim 1, wherein the usage parameter is the temperature of the energy storage module.

12. The method of claim 1, wherein the usage parameter is the offset from the ideal state of charge of the energy storage module.

13. The method of claim 1, wherein the usage parameter is the short term average current level of the energy storage module.

14. The method of claim 1, wherein the usage parameter is the direction energy flow experienced by the energy storage module.

15. The method of claim 1, further comprising:
    operating the electric machine such that the actual operating value of the energy storage module for the usage parameter exceeds the modified minimum operating value.

16. The method of claim 15, wherein the minimum operating value, maximum operating value, and actual operating value are measures of current.

17. The method of claim 15, wherein the minimum operating value, maximum operating value, and actual operating value are measures of temperature.

18. A method for operating a hybrid electric vehicle having an electric machine and at least one energy storage module using a hybrid control module, comprising:
    establishing a predetermined service life target for a selected metric of the energy storage module;
    establishing a maximum operating temperature for the energy storage module;
    operating the electric machine such that an actual operating temperature of the energy storage module does not exceed the defined maximum operating temperature;
    establishing a minimum operating temperature for the energy storage module;
    operating the electric machine such that an actual operating temperature of the energy storage module exceeds the defined minimum operating temperature;
    calculating an indicator indicating progress toward the predetermined service life target, wherein the indicator is calculated using a plurality of actual usage parameters observed during past operation of the energy storage module;
    modifying the maximum operating temperature for the energy storage module based upon the indicator;
    modifying the minimum operating value for the energy storage module based upon the indicator; and
    operating the electric machine such that the actual operating temperature of the energy storage module does not exceed the modified maximum operating temperature.

19. The method of claim 18, wherein a static maximum operating temperature is defined such that the maximum operating temperature may not be modified to exceed said static maximum operating temperature.

20. The method of claim 18, wherein a static minimum operating temperature is defined such that the maximum operating temperature may not be modified to exceed said static minimum operating temperature.

21. The method of claim 18, wherein a maximum temperature adjustment value for a specified period is provided such that the operating temperature may not be modified by an amount greater than said value during said period.

22. A method for operating a hybrid electric vehicle having an electric machine and at least one energy storage module using a hybrid control module, comprising:
    establishing a predetermined service life target in ampere-hours for the energy storage module;

establishing a maximum operating temperature for the energy storage module;

operating the electric machine such that an actual operating temperature of the energy storage module does not exceed the defined maximum operating temperature;

establishing a minimum operating temperature for the energy storage module;

operating the electric machine such that the actual operating temperature of the energy storage module exceeds the minimum operating temperature;

integrating the adjusted ampere-hours expended by the energy storage module during a defined period, wherein the adjusted ampere-hours are calculated as a function of the actual ampere-hours expended during the period and a plurality of actual usage parameters observed during the period;

modifying the maximum operating temperature for the energy storage module based upon a comparison of the adjusted ampere-hours expended and the predetermined service life target;

modifying the minimum operating value for the energy storage module based upon a comparison of the adjusted ampere-hours expended and the predetermined service life target; and operating the electric machine such that the actual operating temperature of the energy storage module does not exceed the modified maximum operating temperature.

* * * * *